US009020482B2

(12) United States Patent
Jones

(10) Patent No.: US 9,020,482 B2
(45) Date of Patent: Apr. 28, 2015

(54) PREVENTING DRIVER DISTRACTION

(71) Applicant: QUALCOMM Incorporated, San Diego, CA (US)

(72) Inventor: Brian R. Jones, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/787,741

(22) Filed: Mar. 6, 2013

(65) Prior Publication Data

US 2014/0256303 A1 Sep. 11, 2014

(51) Int. Cl.
| | |
|---|---|
| *H04M 3/00* | (2006.01) |
| *G06F 12/00* | (2006.01) |
| *G06F 13/14* | (2006.01) |
| *G06F 13/38* | (2006.01) |
| *B60R 22/00* | (2006.01) |
| *H04W 4/02* | (2009.01) |
| *B60W 50/12* | (2012.01) |
| *B60K 35/00* | (2006.01) |
| *G06K 9/00* | (2006.01) |

(Continued)

(52) U.S. Cl.
CPC .............. *H04W 4/027* (2013.01); *B60R 22/48* (2013.01); *B60W 50/12* (2013.01); *B60K 35/00* (2013.01); *G06K 9/0063* (2013.01); *G06K 9/00664* (2013.01); *G06K 9/00671* (2013.01); *G06K 9/00832* (2013.01); *H04M 1/72569* (2013.01); *H04M 1/72577* (2013.01); *H04W 4/046* (2013.01); *B60K 2350/1016* (2013.01); *B60K 2350/2013* (2013.01); *B60K 2350/90* (2013.01); *B60K 2350/901* (2013.01); *B60K 2350/903* (2013.01); *B60K 2350/906* (2013.01); *B60R 2022/4883* (2013.01); *G06K 9/00845* (2013.01); *G06K 9/00838* (2013.01)

(58) Field of Classification Search
CPC .................................. H04W 4/00; H04W 8/22
USPC .............................. 455/418; 710/241; 701/45
See application file for complete search history.

(56) References Cited

U.S. PATENT DOCUMENTS

| 8,145,199 B2 | 3/2012 | Tadayon et al. |
| 8,457,838 B1 | 6/2013 | Fear et al. |

(Continued)

FOREIGN PATENT DOCUMENTS

| CN | 102717773 A | 10/2012 |
| EP | 2218606 A1 | 8/2010 |

(Continued)

OTHER PUBLICATIONS

International Search Report and Written Opinion—PCT/US2014/018796—ISA/EPO—Aug. 27, 2014.

*Primary Examiner* — Opiribo Georgewill
(74) *Attorney, Agent, or Firm* — Silicon Valley Patent Group LLP

(57) ABSTRACT

In some embodiments, a processor-implemented method for disabling at least one text application on a mobile device may comprise: processing an image captured in a vehicle by a mobile device to identify a seat belt in the image; determining a slope of the seat belt relative to a horizon, wherein the horizon is determined using information pertaining to a position and an orientation of the mobile device relative to a frame of reference at a time when the image was captured; determining a speed of the mobile device; and disabling at least one text application on a mobile device based, on the slope of the seat belt and the speed of the mobile device.

45 Claims, 10 Drawing Sheets

(51) Int. Cl.
*H04M 1/725* (2006.01)
*H04W 4/04* (2009.01)
*B60R 22/48* (2006.01)

(56) References Cited

U.S. PATENT DOCUMENTS

2007/0198632 A1* 8/2007 Peart et al. .................... 709/203
2009/0234542 A1* 9/2009 Orlewski ........................ 701/45
2012/0214463 A1 8/2012 Smith et al.
2012/0220213 A1 8/2012 Fischer et al.
2012/0326855 A1 12/2012 Bantz et al.
2013/0145007 A1* 6/2013 Randazzo et al. ............. 709/223
2013/0145065 A1* 6/2013 Ricci .............................. 710/241
2013/0210406 A1* 8/2013 Vidal et al. .................... 455/418

FOREIGN PATENT DOCUMENTS

WO 2008109477 A1 9/2008
WO 2012160251 A2 11/2012

* cited by examiner

PREVENTING DRIVER DISTRACTION

FIELD

The subject matter disclosed herein relates to preventing the use of mobile devices during vehicle operation.

BACKGROUND

Driver distraction from the use of mobile devices such as smartphones while driving is a growing hazard on roads today. According to a National Highway Traffic Safety Administration (NHTSA) study, in 2009, phone use was a contributing factor to the loss of over 5,000 lives and 400,000 traffic related injuries. For example, drivers often send and/or receive text messages while driving—a practice widely known as "texting". To address the texting problem, governments have passed laws that restrict or outlaw driver use of smartphones in vehicles. In addition, attempts have been made to modify driver behavior by educating drivers about the risks of texting.

Technical solutions that use GPS and/or ports in the vehicle, such as the OBDII port to detect phone usage during vehicle movement have also been proposed. Other technical solutions that attempt to detect phone activity while the vehicle is in motion have also been proposed. However, current technical solutions either do not distinguish between driver and passenger use of the phone and/or require vehicle modifications. Therefore, they often depend on driver cooperation to work.

In general, current technical solutions to the problem of driver texting suffer from several drawbacks including: a) the need for vehicle mounted sensors or other modifications to the vehicle, or b) the inability to automatically differentiate between driver and passenger texting or c) a lack of robustness in that the solutions can be easily defeated, or d) a combination of the above.

Therefore, there is a need for a simple, effective, automatic and robust solution to address the problem of driver texting.

SUMMARY

In some embodiments, a processor-implemented method for disabling at least one text application on a mobile device may comprise: processing an image captured in a vehicle by a mobile device to identify a seat belt in the image; determining a slope of the seat belt relative to a horizon, wherein the horizon is determined using information pertaining to a position and an orientation of the mobile device relative to a frame of reference at a time when the image was captured; determining a speed of the mobile device; and disabling at least one text application on a mobile device based, at least in part, on the slope of the seat belt and the speed of the mobile device. The method may be performed on a mobile device, when the mobile device is powered on, or is woken up from a sleep state, or is unlocked. In some embodiments, an emergency number may be displayed upon disabling the text application.

In some embodiments, the seat belt may be identified by detecting at least one edge in the image, wherein the at least one detected edge corresponds to one of two edges of the seat belt. In some embodiments, the slope of the seat belt relative to the horizon may be determined by generating at least one of a pair of lines in the image, each line in the pair corresponding to a detected edge of the seat belt; and determining a slope of the at least one line relative to the horizon, wherein the slope of the seat belt is determined from the slope of the at least one line.

Further, in some embodiments, the at least one text application on the mobile device may be disabled based, in part, on mobile device usage rules in a jurisdiction corresponding to a current location of the mobile device, drive configuration for vehicles in the jurisdiction, and on a determination of whether a user of the mobile device is a driver of the vehicle. In some embodiments, the disabling of the at least one text application on the mobile device is based further, in part, on input from one or more sensors on the mobile device. The determination of whether the user of the mobile device is the driver may be based, in part, on the slope of the seat belt.

In some embodiments, the mobile device may comprise a camera and the camera may be used to capture the image in the vehicle. The position and orientation of the camera may be used as a proxy for the position and orientation of the mobile device. Further, the mobile device may be situated within the vehicle and the speed of the mobile device may serve as a proxy for the speed of the vehicle.

In some embodiments, the jurisdiction corresponding to the current location of the mobile device may be determined based on at least one of: information received from a location server (LCS) in a cellular network serving the mobile device, or a Satellite Positioning System (SPS) in communication with the mobile device.

In some embodiments, information pertaining to the speed of the mobile device, and the position and orientation of the mobile device at the time of image capture relative to the frame of reference is obtained, based in part, from measurements of an Inertial Measurement Unit (IMU) housed in the mobile device, which may comprise an accelerometer.

Disclosed embodiments also pertain to a mobile device comprising: a camera capable of capturing an image in a vehicle; an Inertial Measurement Unit (IMU) coupled to the camera and capable of determining a speed of the mobile device and a position and an orientation of the camera relative to a frame of reference at a time of image capture; and a processor coupled to the camera and the IMU. In some embodiments, the processor may be adapted to process the image captured by the camera to: identify a seat belt in the image; determine a slope of the seat belt relative to a horizon, wherein the horizon is determined using information provided by the IMU pertaining to the position and orientation of the camera relative to a frame of reference at the time when the image was captured; and disable the execution of at least one text application on the mobile device based, at least in part, on the slope of the seat belt and the speed.

In some embodiments, a mobile device may comprise: an imaging means, the imaging means to capture an image in a vehicle; an inertial measurement means coupled to the imaging means, the inertial measurement means to determine a speed of the mobile device and a position and an orientation of the imaging means relative to a frame of reference at a time of image capture; and a processing means coupled to the imaging means and the inertial measurement means, the processing means to process the image captured by the camera. The processing means may further comprise: means for identifying a seat belt in the image; means for determining a slope of the seat belt relative to a horizon, wherein the horizon is determined using information provided by the inertial measurement means pertaining to the position and orientation of the imaging means relative to a frame of reference at the time when the image was captured; and means for disabling the execution of at least one text application on the mobile device based, at least in part, on the slope of the seat belt and the speed.

Disclosed embodiments also relate to non-transitory computer-readable media comprising instructions, which when executed by a processor, perform steps in a method, where the steps comprise: processing an image captured in a vehicle by a mobile device to identify a seat belt in the image; determining a slope of the seat belt relative to a horizon, wherein the horizon is determined using information pertaining to a position and an orientation of the mobile device relative to a frame of reference at a time when the image was captured; determining a speed of the mobile device; and disabling at least one text application on a mobile device based, at least in part, on the slope of the seat belt and the speed of the mobile device.

Disclosed embodiments also pertain to apparatuses, systems, and computer-readable media embodying instructions to perform methods disclosed herein.

DETAILED DESCRIPTION

Figure 1A:
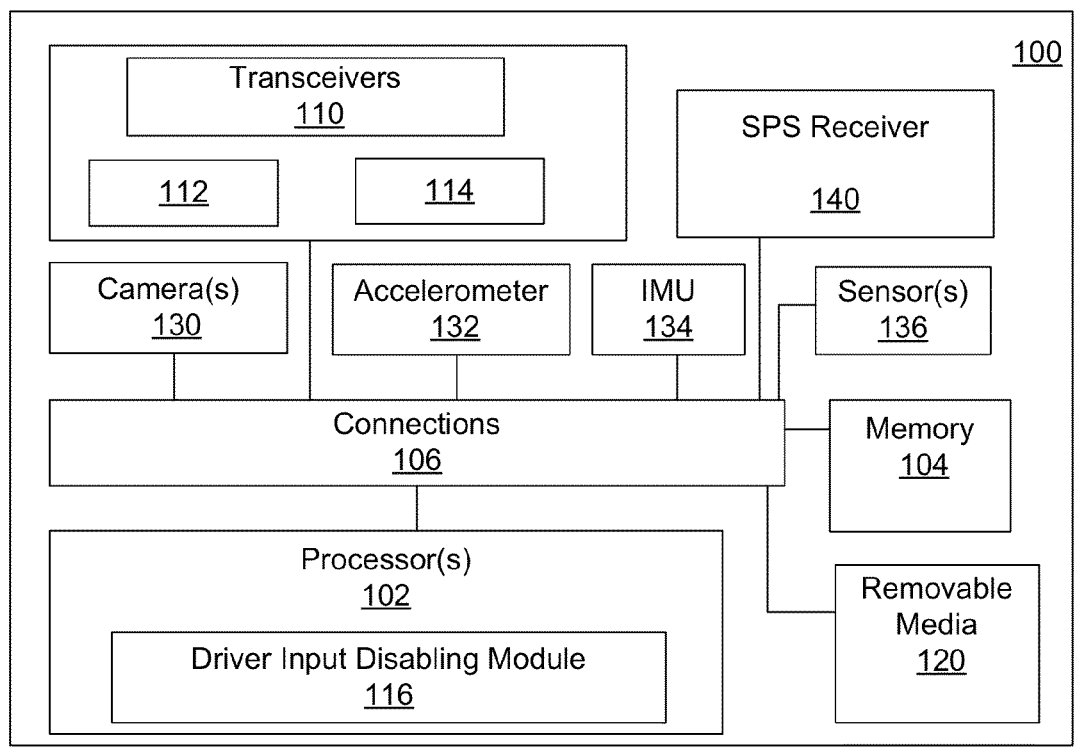
FIG. 1A shows an exemplary mobile device that may be used to prevent driver texting in a manner consistent with embodiments disclosed herein.

The detailed description set forth below in connection with the appended drawings is intended as a description of some exemplary non-limiting embodiments and various other embodiments may be practiced and are envisaged as would be apparent to one of skill in the art. Embodiments described are provided merely as examples or illustrations of the present disclosure. The detailed description includes specific details for the purpose of providing a thorough understanding of the present disclosure. However, it will be apparent to those skilled in the art that the present disclosure may be practiced without one or more of these specific details. In some instances, well-known structures and devices are not shown in block diagram form in order to avoid obscuring the concepts of the present disclosure. Acronyms and other descriptive terminology may be used merely for convenience and clarity and are not intended to limit the scope of the disclosure.

Techniques described herein for use in a mobile device may be implemented in conjunction with various Satellite Positioning Systems (SPS) and/or wireless networks, such as Wireless Local Area Networks (WLAN), a wireless personal area networks (WPAN), wireless wide area networks (WWAN) and so on.

The terms "texting" and "text input" are used broadly in this document to mean user touch input to a mobile device or applications running therein. Touch input may include finger swiping, tapping on the screen, interacting with real or virtual buttons on a mobile device screen, use of a real or virtual keyboard, use of a stylus or other pointing device, hand or finger movements, and/or other gestures designed to provide input to applications running on a mobile device. The term "texting application" is used to mean any application that may utilize and/or request user text input during execution. Texting applications include, without limitation, software applications that request user input, operating system Graphical User Interfaces (GUIs) or "home screens" that request user input to invoke other applications and/or to unlock or wake-up the mobile device.

The urge to text arises from a psychological need to remain connected and often trumps safety considerations. Texting competes with driving for cognitive, visual and motor functions and results in driver inattention and lower road safety for all. Current technical solutions either do not distinguish between driver and passenger use of the phone and/or require vehicle modifications. For example, in a conventional method, users may be presented with a screen requesting confirmation of their status as non-driver passengers in the vehicle. Errant drivers may be able to bypass the system by falsely confirming their status as passengers. Moreover, such screens merely increase the effort needed for driver use of the mobile device thereby potentially increasing the level of driver distraction.

Accordingly, apparatus, systems and methods are disclosed herein that facilitate the prevention of texting by vehicle operators.

FIG. 1A shows schematic block diagram illustrating certain exemplary features of mobile device or Mobile Station (MS) 100 that may be used to prevent driver texting in a manner consistent with embodiments disclosed herein. MS 100 may also be referred to as a mobile terminal, a user equipment (UE), an access terminal (AT), a subscriber station, a station (STA), etc. The term "mobile station" is also intended to include devices which may communicate with a personal navigation device (PND), for example by using short-range wireless, infrared, wireline connection, or other connection. Also, MS 100 may be a cellular phone, a personal digital assistant (PDA), a tablet computer, a handheld device, a wireless device, a notebook computer, etc., which are capable of wireless communication with a server.

Mobile device or Mobile Station (MS) 100 may, for example, include: one or more Processors 102, Memory 104, Transceivers 110 (e.g., wireless network interfaces), Satellite Positioning System (SPS) receiver 140 (as applicable), one or more Cameras 130, Removable Media drive 120, and, as applicable, Accelerometer 132, Inertial Measurement Unit (IMU) 134 and/or Sensors 136. The functional units in MS 100 may be operatively coupled through one or more connections 106 (e.g., buses, lines, fibers, links, etc.). In certain example implementations, all or part of mobile terminal 120 may take the form of a chipset, and/or the like.

Exemplary mobile device 100 may be modified in various ways in a manner consistent with the disclosure, such as, by combining (or omitting) one or more of the functional blocks shown. For example, in some embodiments, IMU 134 may comprise accelerometer 132. In other embodiments, IMU 134 may comprise some combination of 3-axis accelerometers, 3-axis gyroscopes, and/or magnetometers. Further, in certain example implementations, portions of mobile device 100 may take the form of one or more chipsets, and/or the like.

SPS receiver 140 may be enabled to receive signals associated with one or more SPS resources including, for example satellites and pseudolites. A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting Satellite Vehicles (SVs). As used herein an SPS may include any combination of one or more global (such as Galileo, GPS, GLONASS etc), and/or regional navigation satellite systems such as satellite systems (such as QZSS, Beidou, IRNSS etc) and/or augmentation systems. Further SPS signals may include SPS, SPS like, and/or other signals, such as pseudolite and/or Assisted-GPS (A-GPS) signals, associated with such one or more SPS.

Transceiver 110 may, for example, include a transmitter 112 enabled to transmit one or more signals over one or more types of wireless communication networks and a receiver 114 to receive one or more signals transmitted over the one or more types of wireless communication networks. Transceivers 110 may permit communication with wireless networks based on a variety of technologies such as, but not limited to, Wi-Fi networks or Wireless Local Area Networks (WLANs), which may be based on the IEEE 802.11 family of standards. WPANs using Bluetooth, Infrared, or other technologies based on the IEEE 802.15 family of standards. In some embodiments, transceivers 110 may facilitate communication using Near Field Communication (NFC) and/or femtocells. Transceivers 110 may also enable communication through Wireless Wide Area Networks (WWANs) such as LTE, WiMAX, etc. In some embodiments, MS 100 may access one or more of the above networks using Access Points (APs), which may external to, or may be housed in a vehicle.

WWANs or Cellular networks may include Code Division Multiple Access (CDMA) 1X network, a High Rate Packet Data (HRPD) network, a Wideband CDMA (WCDMA) network, a Global System for Mobile Communications (GSM) network, a General Packet Radio Service (GPRS) network, a Long Term Evolution (LTE) network, or some other wireless network. GSM, WCDMA and GPRS are part of Universal Mobile Telecommunications System (UMTS). LTE is part of Evolved Packet System (EPS). CDMA 1X and HRPD are part of cdma2000. GSM, WCDMA, GPRS and LTE are described in documents from a consortium named the "3rd Generation Partnership Project" (3GPP). CDMA 1X and HRPD are described in documents from a consortium named the "3rd Generation Partnership Project 2" (3GPP2). WLANs may include, for example, wireless networks compatible with the Institute of Electrical and Electronics Engineers (IEEE) 802.11x family of standards, which may also be referred to as a Wi-Fi network. WPANs may include Bluetooth networks, networks based on the IEEE 802.15x family of standards, or some other types of networks.

In one embodiment, MS 100 may be able to communicate with an onboard processor or vehicle navigation system using Bluetooth or a WLAN using transceivers 110. For example, MS 100 may be able to obtain vehicle location information or other vehicle related information from the processor and/or navigation system housed in a vehicle using a Bluetooth or WLAN connection. In another embodiment, MS 110 may be able to communicate with a cellular network provider server over the WWAN, while simultaneously obtaining location information using SPS Receiver 140.

Processors 102 may be implemented using a combination of hardware, firmware, and software. In some embodiments, processing unit 102 may include Driver Input Disabling Module (DIDM) 116, which may process one or more images captured by cameras 130 along with inputs from one or more of accelerometer 132, IMU 134, sensors 136, transceiver 110 and/or SPS receiver 140, to prevent or curtail driver texting. For example, in one embodiment, Driver Input Disabling Module 116 may process images captured by camera 130 along with contemporaneous input received from accelerometer 132 and/or IMU 134 in accordance with disclosed embodiments to prevent driver texting. In another embodiment, location related information such as position, speed, etc based on input from SPS Receiver 140 may also be processed by DIDM 116. The term speed is used herein to refer to the distance traveled by the vehicle in a time period without regard to the direction of travel. In some embodiments, Driver Input Disabling Module 116 may request and/or report Received Signal Strength Indicator (RSSI) measurements of wireless network signals such as Bluetooth signals from an Access Point (AP) in a vehicle, and may use the measurements in conjunction with images captured by camera(s) 130 to determine and/or validate the location of MS 100 within a vehicle.

Processors 102 may also be capable of processing other information either directly or in conjunction with one or more other functional blocks shown in FIG. 1. For example, Processors 102 may process and combine raw measurements from accelerometer 132, IMU134, sensors 136 and/or SPS receiver to derive additional information. For example, processors 102 may be able to determine vehicle location and/or speed based on input from SPS receiver 140 and/or IMU 134. In some embodiments, Processors 102 may represent one or more circuits configurable to perform at least a portion of a computing procedure or process related to the disabling of driver input in a manner consistent with disclosed embodiments.

Sensors 136 may include one or more sensors of various types. In some embodiments, processors 102 and DIDM 116 may be configured to accept and process input from the sensors available on MS 100. Sensors 136 may be able to detect and measure RF energy such as RSSI and/or perform ranging to detect position and/or motion of MS 100. Other sensors may include an ambient light sensor, which may used to measure ambient light and adjust settings on camera 130. In some embodiments, input from sensors 136 may be further processed to determine a variety of information that may be input to Driver Input Disabling Module 116, which may then use the information to determine whether to disable texting. In some embodiments, sensors 136 may include acoustic sensors such as microphones and/or speakers. In one embodiment, input from an acoustic sensor may be processed and used to determine a position of MS 100 in a vehicle. For example, input from acoustic sensors may be used for ambient noise classification, to determine echoes/reverberation, for self-location, and/or for speech or machine noise recognition and may be processed by processors 102 to determine a possible location of MS within a vehicle. As another example, input from accelerometer 132 and/or IMU 136 may be processed to determine relative motion, speed, distance, and/or device orientation.

In some embodiments, cameras 130 may include front-facing and rear-facing cameras and may also incorporate CMOS sensors for image recognition, motion and gaze detection. Front facing camera 130 may face the user during normal operation of the device, while rear facing camera 130 may face away from the user during normal operation of the device. In some embodiments, DIDM 116 may receive images captured by front and rear facing cameras and may process one or more of the captured images to determine whether to disable texting applications on MS 100. In another embodiment, cameras 130 may include depth or distance sensors, which may provide depth or distance related information for each pixel in captured images. Input from the depth sensors may be used by DIDM 116 in determining whether to disable texting applications on MS 100. In some embodiments, the focal length of the camera and other parameters may also be used by texting applications on MS 100 in analyzing captured images.

The methodologies described herein may be implemented by various means depending upon the application. For example, these methodologies may be implemented in hardware, firmware, software, or any combination thereof. For a hardware implementation, processors 102 may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

For a firmware and/or software implementation, the methodologies may be implemented using procedures, functions, and so on that perform the functions described herein. Any non-transitory machine-readable medium tangibly embodying instructions may be used in implementing the methodologies described herein. Non-transitory computer-readable media may include physical computer storage media. A storage medium may be any available medium that can be accessed by a computer. In one embodiment, software code pertaining to driver input disabling may be stored in a non-transitory computer-readable medium and read using removable media drive 120 and executed by at least one of processors 102. For example, the methods and/or apparatuses presented herein may take the form in whole or part of a computer-readable medium that may include program code to support driver input disabling in a manner consistent with disclosed embodiments.

Non-transitory computer-readable media may include a variety of physical computer storage media. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In some embodiments, computer readable media and/or memory 104 may store program code and data for DIDM 116. For example, jurisdiction related information including current seat belt standards in use; speed thresholds for mobile device operation, if any; the vehicle drive configuration, which pertains to whether the jurisdiction uses left hand or right hand drive; etc may be stored in databases on computer-readable media and/or memory 104.

Memory 104 may be implemented within processors 102 and/or external to processor 102. As used herein the term "memory" refers to any type of long term, short term, volatile, nonvolatile, or other memory and is not to be limited to any particular type of memory or number of memories, or type of media upon which memory is stored. In general, Memory 104 may represent any data storage mechanism. Memory 104 may include, for example, a primary memory and/or a secondary memory. Primary memory may include, for example, a random access memory, read only memory, etc. While illustrated in FIG. 1 as being separate from processors 102, it should be understood that all or part of a primary memory may be provided within or otherwise co-located/coupled with Processor 102.

Secondary memory may include, for example, the same or similar type of memory as primary memory and/or one or more data storage devices or systems, such as, for example, flash/USB memory drives, memory card drives, disk drives, optical disc drives, tape drives, solid state memory drives, etc. In certain implementations, secondary memory may be operatively receptive of, or otherwise configurable to couple to a non-transitory computer-readable medium in removable media drive 120. In some embodiments, non-transitory computer readable medium may form part of memory 104.

In addition to storage on computer readable medium, instructions and/or data may be provided as signals on transmission media included in a communication apparatus. For example, a transceiver may receive signals indicative of instructions and data. The instructions and data may cause one or more processors to implement the functions outlined in the claims. That is, the apparatus includes transmission media with signals indicative of information to perform disclosed functions.

Figure 1B:
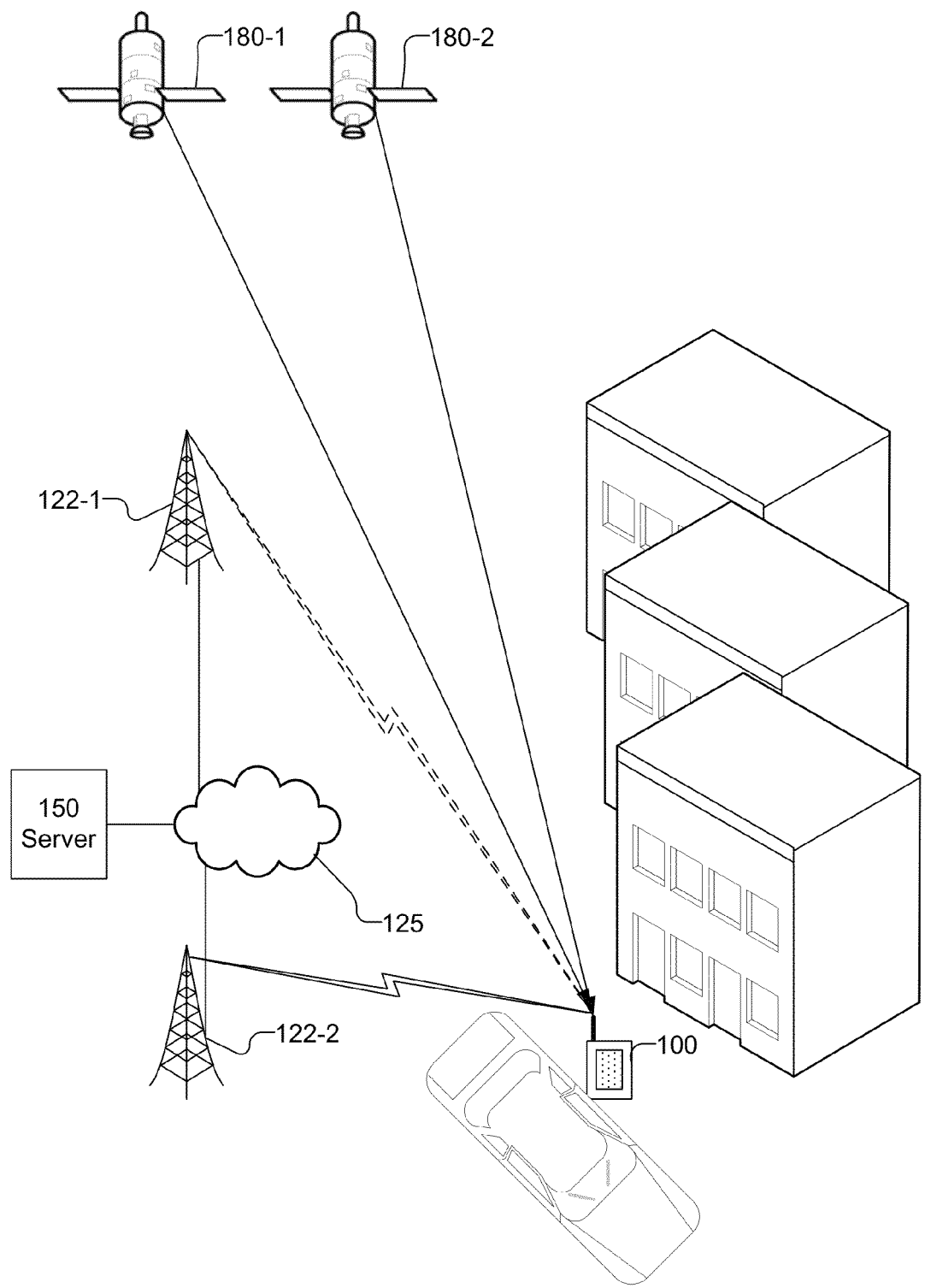
FIG. 1B shows a vehicle in which MS 100 may be present and communicating with one or more wireless networks.

FIG. 1B shows a vehicle in which MS 100 may be present and communicating with one or more wireless networks. In FIG. 1B, although MS 100 is within the vehicle, MS 100 has been enlarged and shown outside the vehicle for descriptive purposes. MS 100 may be in communication with SVs 180 and/or wireless network 125 through Access Points 122-1 and 122-2. SPS signals from SVs 180, such as GPS signals, may be used to derive position and speed related information by MS 100.

In some embodiments, when GPS/A-GPS signals are unavailable, network based positioning methods may be used to estimate the position and speed of MS 100, which may serve as a proxy for the speed of the vehicle. Network based positioning methods may include trilateration using RSSI or Round Trip Time (RTT) measurements, Angle of Arrival (AoA), and other techniques. In some instances, the position of MS 110 may be further refined using information received IMU 130.

In some embodiments, the most recent position fix obtained using some combination of information from SPS and/or GPS/A-GPS, network based positioning methods, and/or IMU based measurements may be used to estimate the location MS 100. In some embodiments, MS 100 may receive location assistance information from server 150 over wireless network 125 and may use the location assistance information to determine its position. In general, network 125 may include various additional entities (not shown) such as a Location Server (LCS), LCS clients, other servers, etc.

In some embodiments, MS 100 or DIDM 116 may also download, request, update and/or receive jurisdiction related information from server 150, which may be stored locally in memory 104. The jurisdiction related information may pertain to seat belt standards in use for the jurisdiction, speed thresholds for mobile device operation, if any, and/or a vehicle drive configuration, which may specify whether the jurisdiction uses left hand or right hand drive. In some embodiments, MS 100 may also determine the appropriate jurisdiction related information by looking up the jurisdiction related information based upon its current location in databases on computer-readable media in removable media drive 120. In some embodiments, information on local databases in MS 100 may be updated periodically by server 150.

Figure 2A:
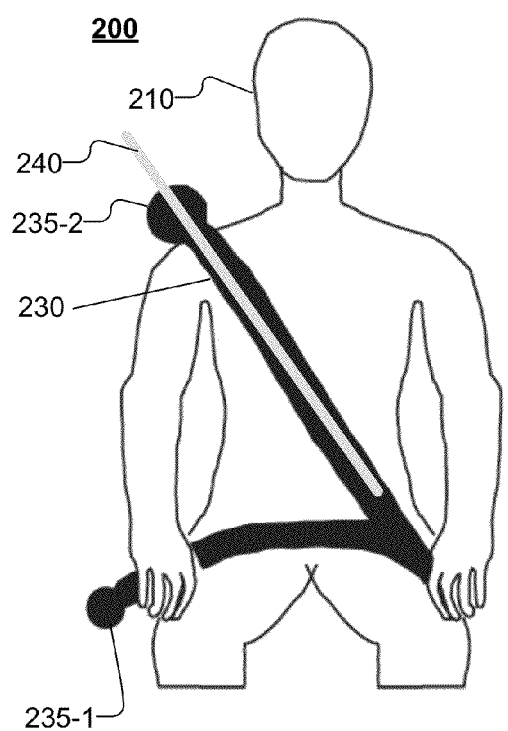
FIG. 2A shows an exemplary image, which, in some instances, may be captured by a camera on a mobile device used by a passenger in a vehicle.
Figure 2B:
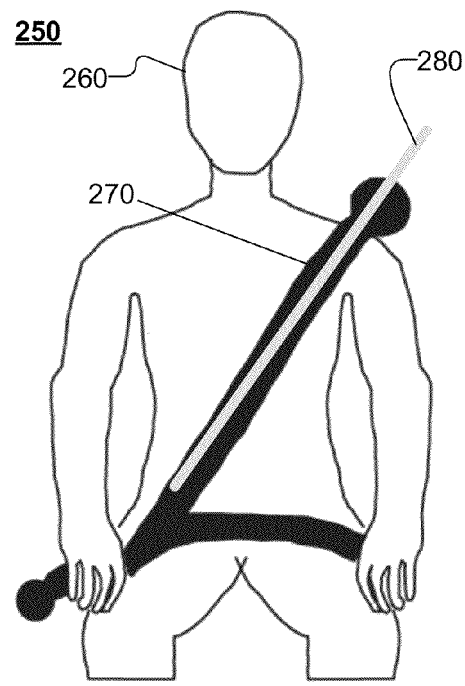
FIG. 2B shows an exemplary image, which, in some instances, may be captured by a camera on a mobile device used by a driver in a vehicle.

FIG. 2A shows an exemplary image 200, which may be one of several images captured by camera 130 on a mobile device 100 used by a passenger in a vehicle. FIG. 2B shows an exemplary image 250, which may be one of several images captured by camera 130 on a mobile device 100 used by a driver in a vehicle. For example, image 200 may be captured by a camera 130 facing the user (e.g. front facing camera 130), when the user of mobile device 100 is a passenger; whereas image 250 may be captured by a camera 130 facing the user, when the user of the mobile device is a driver. Note that images 200 and 250, as described above, may represent a jurisdiction where vehicles are equipped with a left-hand drive configuration (e.g. the U.S.) where the steering column is located to the left of the vehicle.

However, the methods and techniques disclosed herein may also be applied with appropriate modifications to jurisdictions where vehicles have a right hand drive configuration (e.g. the United Kingdom) and the steering column is located to the right of the vehicle. In a right hand drive vehicle, image 200 would represent a user who is a driver, while image 250 would represent a user who is a passenger. For the purposes of the following discussion, left hand drive is assumed unless otherwise noted.

In some embodiments, an algorithm to disable driver input during vehicle operation may use an image, such as one of image 200 or 250, as input, to determine if a user of mobile device 100 is a passenger or driver. In some embodiments, the algorithm may be implemented in whole or in part by Driver Input Disabling Module 116. In some embodiments, image 200 or image 250 may be one of a series of images captured by camera 130.

Figure 2C:
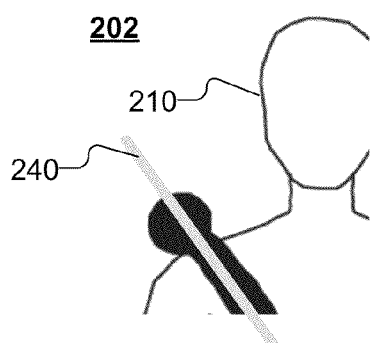
FIGS. 2C, 2D and 2E exemplary images, which, in some instances, may be captured by a camera on a mobile device used by a passenger in a vehicle.
Figure 2F:
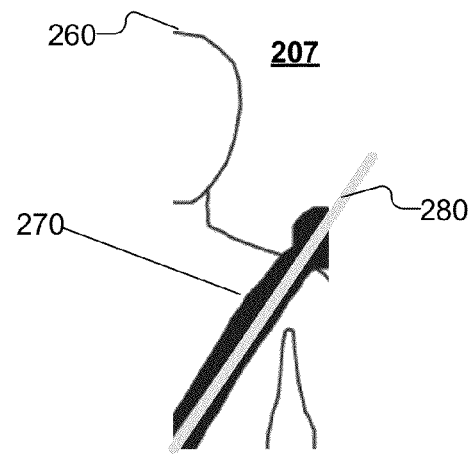
FIGS. 2F and 2G show exemplary images, which, in some instances, may be captured by a camera on a mobile device used by a driver in a vehicle.
Figure 2D:
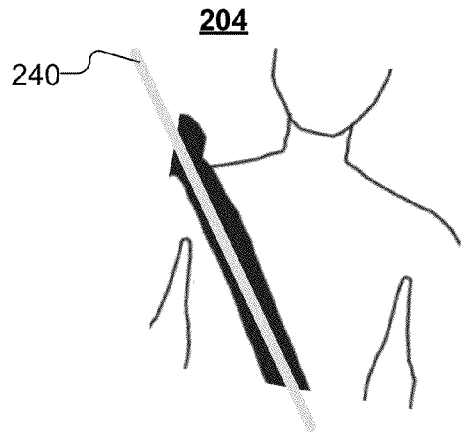
Figure 2G:
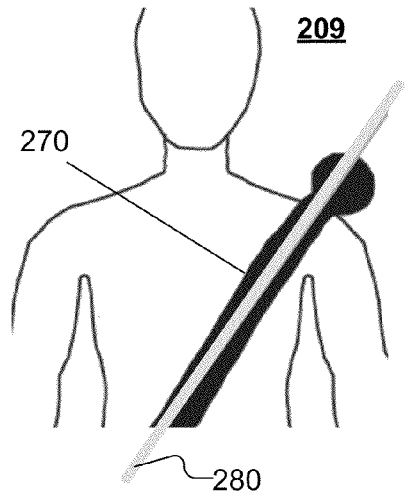
Figure 2E:
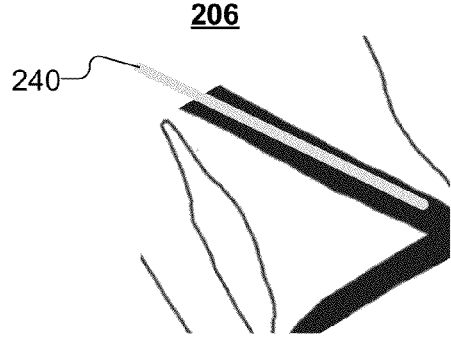

FIGS. 2C, 2D and 2E show images 202, 204 and 206, respectively of other images captured of passenger 210 by camera(s) 130. As shown in FIGS. 2C, 2D and 2E, camera 130 may capture some portion of image 200 or some portion of image 250. For example, depending on the orientation of camera 130, images 200, 202, 204 and 206 may comprise some portion of the image of passenger 210, and the image may be at various angular orientations.

FIGS. 2F and 2G show images 207 and 209, respectively of other images captured of driver 260 by camera(s) 130. As shown in FIGS. 2C, 2D and 2E, camera 130 may capture some portion of image 250. For example, depending on the orientation of camera 130, images 250, 207 and 209 may comprise some portion of the image of passenger 260, and the image may be at various angular orientations.

Figure 2H:
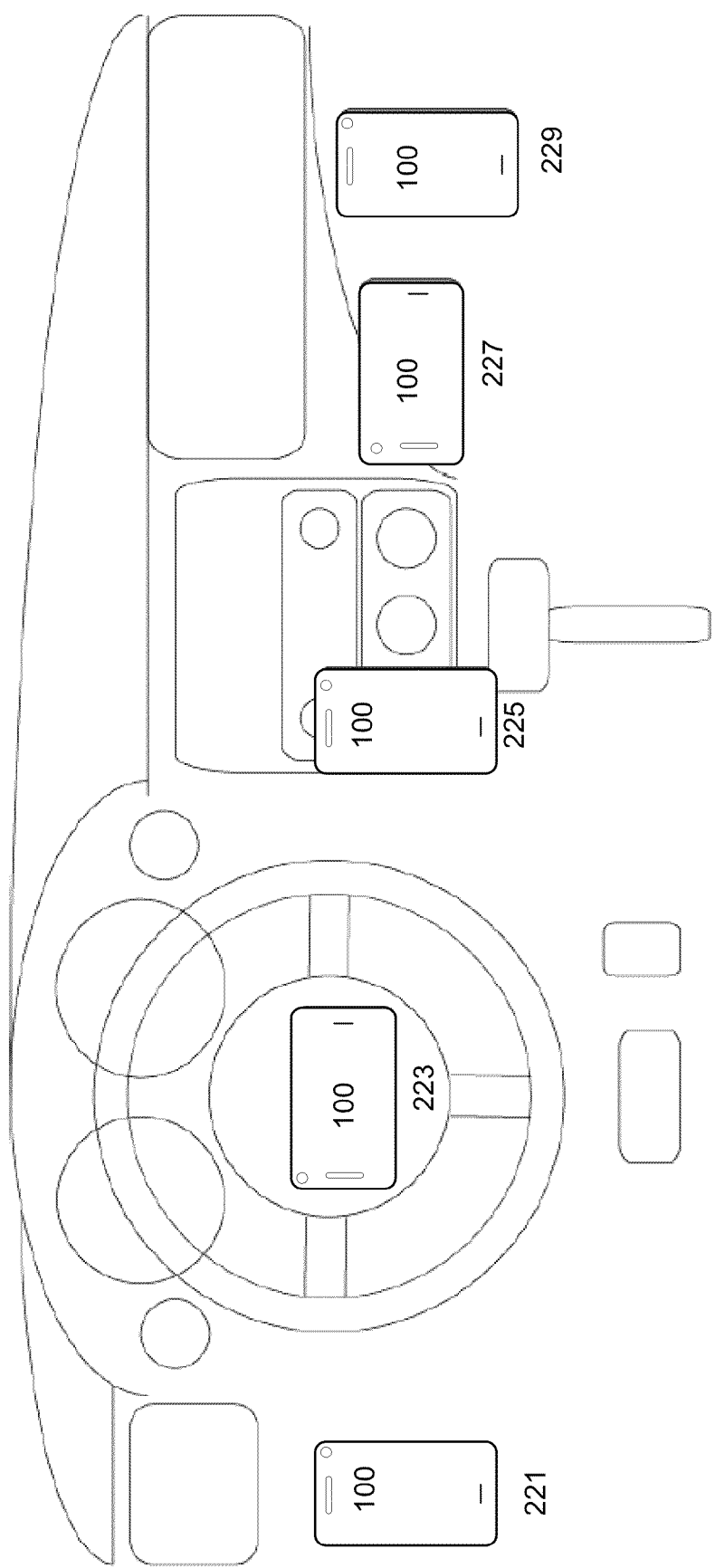
FIG. 2H shows various locations in a vehicle where images may be captured.

FIG. 2H shows various locations in a vehicle where images may be captured. As shown in FIG. 2H, images 200 and/or 250 may be captured at various locations in the vehicle. Positions 221 and 223 are examples of positions where a driver may attempt to use MS 100, while positions 227 and 229 are examples of positions where a passenger may attempt to use MS 100.

In some embodiments, an algorithm for disabling driver texting may capture images using rear facing camera contemporaneously with the capture of images by front facing camera. In some embodiments, the images captured by rear facing camera may be processed to determine the existence of other distinct features, such as a windshield, portion of a steering wheel, dashboard, glove compartment, and/or the instrument panel. In some embodiments, a decision to disable user access to texting application may be based, in part on the results of processing images captured by rear facing camera.

In some embodiments, images 200, 202, 204, 206, 207, 209, and/or image 250 may be captured when a user attempts to use mobile device 100 either when held by the user, or placed/mounted on the dashboard such as at location 225 or at another location in the vehicle.

In some embodiments, a sequence of images may be captured by camera 130 at predetermined intervals during a wake up or boot up process or during user attempts to unlock the device for use and one or more images from the sequence may be selected for processing. In some embodiments, the predetermined intervals may be set by DIDM 116. For example, image 250 may be one of a sequence of images captured by camera 130 during the wake up sequence of mobile device 100 when driver 260 attempts to wake up mobile device 100.

Referring to FIG. 2A, image 200 shows passenger 210 wearing seat restraint or seat belt 230, while image 250 shows driver 260 wearing seat belt 240. The term seat belt is used to mean any vehicle occupant restraint mechanism such as but not limited to shoulder belts, three point belts, seat mounted belts, automatic or semi-automatic belts. The techniques and methods disclosed herein may be adapted and applied to various restraining mechanisms as would be apparent to one of ordinary skill in the art.

Typically, the width of seat belts 230 and 270, torso sizes of occupants, and the locations of anchor points 235, such as exemplary anchor points 235-1 and 235-2 are standardized. For example, U.S. Federal Motor Carrier Safety Administration (FMCSA) Standard Nos. 210 and 571.210 establish requirements for seat belt assembly anchorages to insure their proper location for effective occupant restraint and to reduce the likelihood of their failure. Accordingly, the information pertaining to belt thicknesses and anchorage points may be made available to an application to disable driver input during vehicle operation such as exemplary Driver Input Disabling Module 116. In some embodiments, the information may be stored in databases on MS 100 and/or server 150.

In some embodiments, image 200 captured by camera 130 may be processed to determine line 240, which may be used to represent seat belt 230. Similarly, image 250 may be processed to determine and extract line 280, which may used to represent seat belt 270. Various well-known computer vision, image processing and feature extraction algorithms, such as the Hough Transform, Canny edge detection algorithm and its variants, second order algorithms, and other edge and shape detection and/or shape recognition algorithms may be used to determine either line 240 or line 280 from images 200 and 250, respectively. Edge detectors use mathematical techniques to identify line(s) in a digital image. Sets of points where the image has discontinuities may be grouped to form the line(s).

In some embodiments, the standards above (such as the FMCSA standard) may be used to set parameters for an edge detection algorithm that is used to detect seat belts in digital images. In some embodiments, such as in instances where the image is rotated, skewed, and/or at an angular orientation, as shown in images 204 and 206 in FIGS. 2D and 2E, respectively, the images may be rotated and or aligned prior to processing. In some embodiments, input from IMU 134 or accelerometers 132 may be used, in part, to correct the orientation of the images captured by camera(s) 130 prior to further processing of the images. For example, an edge of seat belts 230 or 270 worn by the user of MS 100 may be detected by an edge detection algorithm, which may be part of DIDM 116 and may be used to derive lines 240 or 280.

In some embodiments, a method to disable driver texting may determine the slope of a line representing the seat belt based on the captured image. For example, using image 200 (which represents the image of passenger 210) using line 240, it may be determined that seat belt 230 is sloping downwards from left to right in the image. A similar determination may be made based on image 250 (which represents the image of driver 260) and line 280 that belt 270 is sloping downwards from right to left in the image. Accordingly, in some embodiments, a program to disable driver texting may identify the user as a passenger if the line corresponding to the seat belt in an image captured by camera 130 slopes downward from left to right. Conversely, a program to disable driver texting may identify the user as a driver if the line corresponding to the seat belt in an image captured by camera 130 slopes downward from right to left.

In one embodiment, an exemplary frame of reference may be constructed using mutually orthogonal X, Y and Z axes based on a Z-axis in the direction of gravity. Accordingly, an orthogonal X-axis, which may be transversely oriented across the vehicle and an orthogonal Y-axis, which may be oriented lengthwise from the front to rear of the vehicle, may be selected with reference to the Z-axis. The frame of reference described above is exemplary and for descriptive purposes only. In general, various other frames of reference may be used with appropriate modifications to embodiments disclosed herein, as would be apparent to one of ordinary skill in the art.

Figure 2I:
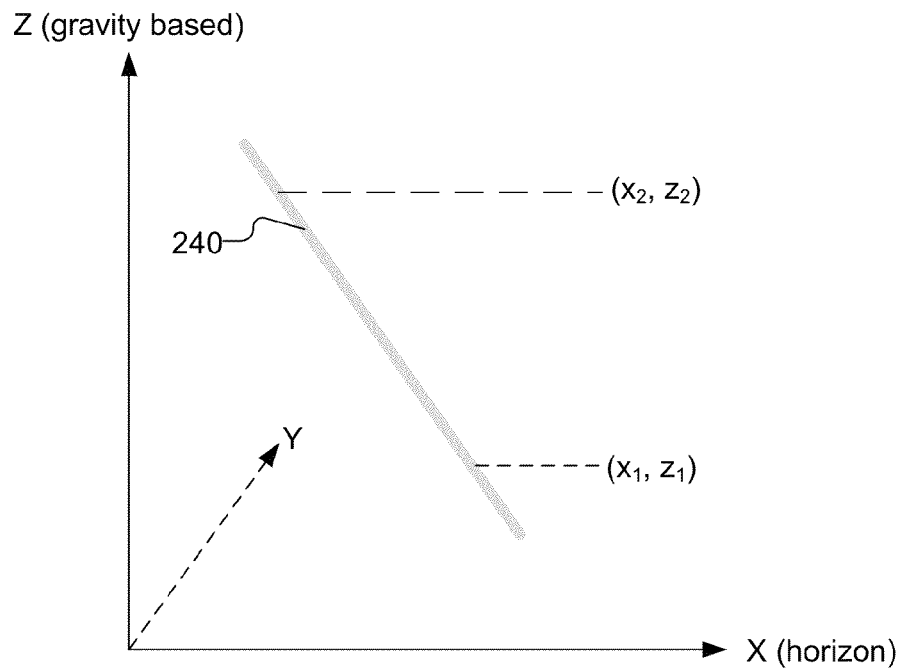
FIG. 2I shows a line with a negative slope in the X-Z plane representing the seat belt of a passenger.
Figure 2J:
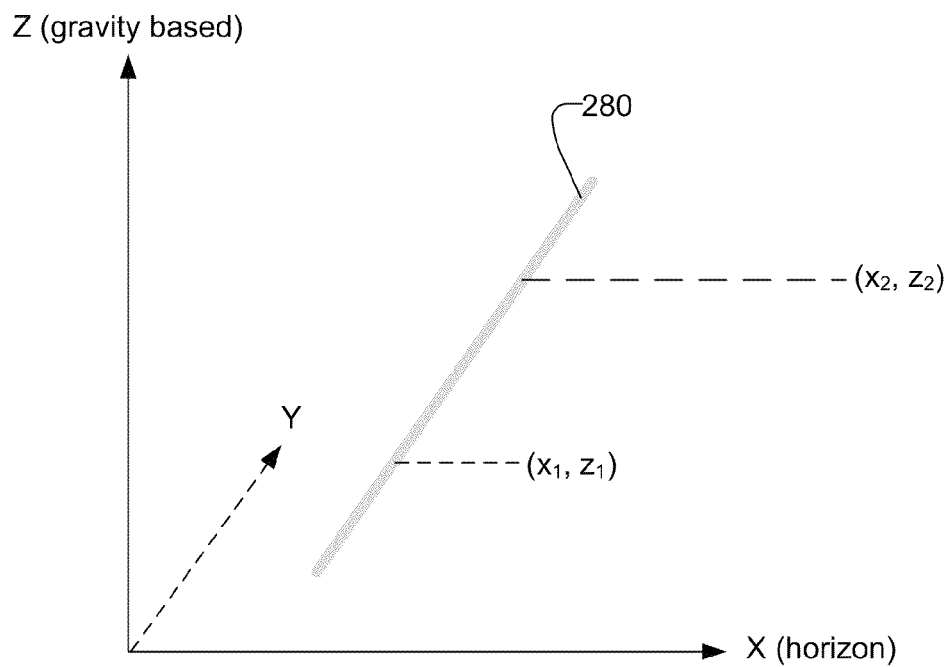
FIG. 2J shows a line with a positive slope in the X-Z plane representing the seat belt of a driver.

As shown in FIG. 2I, in the X-Z plane, line 240 representing seat belt 230 of passenger 210 has a negative slope. As shown in FIG. 2J, line 280 representing seat belt 240 of driver 260 has a positive slope. The slope of a line, such as lines 240 and 280, in the X-Z plane may be given by $\Delta z/\Delta y$, where $\Delta z$ represents the change in value of z for a $\Delta y$ change in the value of y for two points along the line. Accordingly, for two points $(x_1, z_1)$ and $(x_2, z_2)$, the slope may be given by $$\frac{\Delta z}{\Delta x} = \frac{z2 - z1}{x2 - x1}.$$

In FIGS. 2I and 2J, exemplary points $(x_1, z_1)$ and $(x_2, z_2)$ are shown for lines 240 and 280. The slopes of lines 240 and 280 represent the orientations of seat belts 230 and 270, respectively, relative to the frame of reference. In some embodiments, the slope of line 240 or the slope of line 280 may be used, in part, to make a determination of whether the user of mobile device 100 is the driver or passenger of the vehicle.

In some embodiments, input from accelerometer 132 and/or IMU 134 at the time of image capture may be used to register image 200 or image 250 relative to an artificial local horizon in order to determine the slope of line 240 or line 280.

An artificial horizon indicates the position of the horizon during MS operation. The horizon may provide the orientation of the camera or the mobile device relative to the axes. If the form factor of the mobile device 100 is small enough then position and orientation of the camera may be substituted or used as a proxy for the position and orientation of the mobile device (or vice versa).

In some embodiments, the slope of line 240 or line 280 may be determined relative to the horizon. For example, in one embodiment, the horizon may be used as the X-axis in the frame of reference in FIGS. 2I and 2J. In some embodiments, accelerometer 132 and/or IMU 134 measurements may be used to obtain the position and orientation of mobile phone 100 and/or camera 130 at the time of image capture relative to the frame of reference. For example, the orientation of one or more axes of mobile phone 100 or camera 130 relative to ground and/or gravity at the time of image capture may be provided. As an example, accelerometer may provide the tilt of the mobile phone 100 relative to the Z-axis (gravity) at the time of image capture. In some embodiments, inputs from accelerometer 132 and/or IMU 134 at the time of image capture may be used to determine image orientation relative to the frame of reference.

In some embodiments, various well known computer vision and image processing algorithms may be used to determine the horizon and the slope of line 240 or line 280 relative to the horizon. Lines 240 and 280, which correspond to an edge of the seat belt, are shown in FIGS. 2A-2G. Further, in some embodiments, the image may be rotated and/or aligned with the frame of reference based on input from accelerometer 132 and/or IMU 134 prior to processing the image to identify and or determine the slopes of line 240 or line 280.

In some embodiments, the standards may be used to inform or set parameters for the edge detection algorithm that operates on the digital images. For example, based on the standards and input from sensors, lines may be identified in an angular range relative to the artificial local horizon after the captured image has been rotated and deskewed. For example, edges with angles in the range $\theta_L \leq \theta_i \leq \theta_M$ may be identified and/or considered as representing an edge of the seat belt, where $\theta_L$ and $\theta_M$ are angles that specify an upper and lower threshold for the angle $\theta_i$ of an edge i relative to the horizon. In some embodiments, one or more of the detected edges may be joined to obtain lines 240 and/or 280. In some embodiments, the angular range may increase the probability that the edges detected correspond to an edge of the seat belt. Various other techniques such as a minimum edge length, etc may be used to identify one of the detected edges as an edge of the seat belt.

In some embodiments, the slope of line 240 or 280 may be used to determine if the user is a driver or a passenger. In the event that the user is a driver, inputs from one or more additional sensors may be used by an application to disable driver texting or input during vehicle operation to determine whether a driver can be locked out of one or more applications. For example, the speed and location of the vehicle may be parameters to an application to determine whether to disable driver texting during vehicle operation. In one embodiment, if the image identifies the user of MS 100 as the driver, then, based on input from other sensors or functional units in MS 100, the user may be denied access to a texting application. For example, if input from SPS receiver 140 indicates that vehicle is traveling above a threshold speed, then, DIDM 116 may deny texting application access to a user identified as a driver. In the event that DIDM 116 detects that the user is a passenger, the passenger may be permitted to access the requested texting application. For example, passenger 210 may be permitted to send text messages.

In one embodiment, an application to disable driver input during vehicle operation may curtail driver 260 from using a texting application if the speed of the vehicle exceeds some speed threshold. In another embodiment, an application to disable driver input during vehicle operation may permit driver 260 to use a texting application, if the position of the driver, which may be determined using some combination of measurements from SPS receiver 140, trilateration based on RSSI or RTT measurements, and/or IMU 134, is determined to be in a jurisdiction that permits the use of mobile devices and texting applications during vehicle operation. In some embodiments, an application to disable driver input during vehicle operation may consult databases resident in memory 104 or stored in removable media 120 on mobile device 100, or received from a network server 150 to determine whether driver 260 may access one or more texting applications.

Figures 2K, 2L:
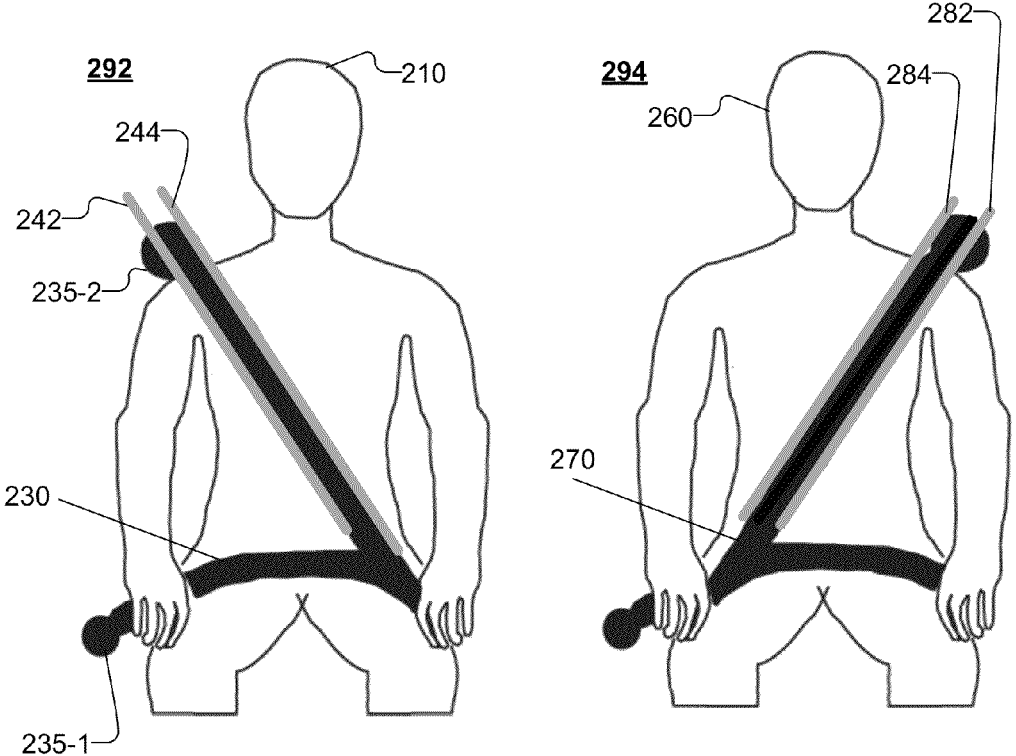
FIG. 2K shows an exemplary image, which, in some instances, may be captured by a camera on a mobile device used by a passenger in a vehicle.
FIG. 2L shows an exemplary image, which, in some instances, may be captured by a camera on a mobile device used by a driver in a vehicle.

FIG. 2K shows an exemplary image 290, which may be captured by camera 130 on a mobile device 100 used by a passenger in a vehicle. FIG. 2L shows an exemplary image 292, which may be captured by camera 130 on a mobile device 100 used by a driver in a vehicle. For example, image 290 may be captured by a camera 130 facing the user (e.g. front facing camera 130), when the user of mobile device 100 is a passenger; whereas image 292 may be captured by a camera 130 facing the user, when the user of the mobile device is a driver. In some embodiments, DIDM 116 or another application to disable driver texting may process images 292 and/or 294 to identify first edges of seat belts 230 and 270, respectively. In FIGS. 2K and 2L, first line 244 in image 292 and line 284 in image 294 represent the first detected edges of seat belts 230 and 270, respectively. In some embodiments, second edges of seat belts 230 and 270 may also be detected as shown by second lines 242 and 282, respectively. In some embodiments, seat belt standards may be used to inform or set parameters for an edge detection algorithm that operates on the digital images. For example, based on the standards, lines may be identified in an angular range relative to an artificial local horizon after the captured image has been rotated and deskewed.

With respect to FIG. 2K, in some embodiments, the slopes of lines 244 and 242 may be determined relative to a horizon. If lines 244 and 242 do not intersect in image 292 and slopes of both lines are negative, then, the lines may be viewed as representing seat belt 230. In some embodiments, a proximity threshold or a distance between lines 244 and 242 may also be established based on seat belt standards used in the jurisdiction (such as FMCSA Standard Nos. 210 and 571.210) and parameters associated with camera 130 when taking image 292, as well as input from other sensors. In FIG. 2L, a second line 282 corresponding to a second edge of seat belt 270 may be similarly detected in image 294. In some embodiments, the detection of second edges of seat belts 230 and/or 270 may be optional. For example, second lines 242 and/or 282 may be extracted from images 292 and 294, respectively, as corroboration that first edges 244 and 283 correspond to actual edges of seat belts.

Figure 3A:
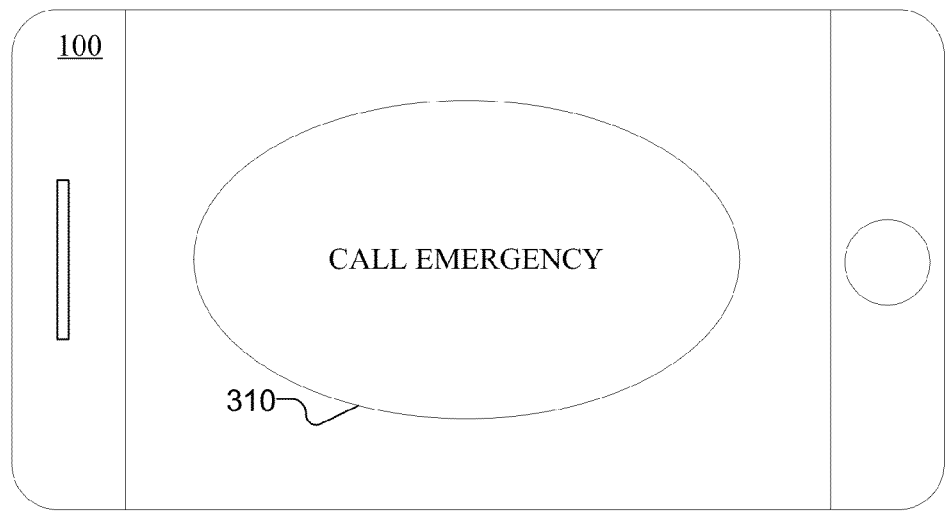
FIG. 3A shows an exemplary UI presented to a driver upon attempting to use an application on a mobile device with touch input.

FIG. 3A shows an exemplary UI presented to a driver upon attempting to use an application on a mobile device 100 with touch input. As shown, in FIG. 3A, in some embodiments, if a driver attempts to use a texting application on mobile phone 100, then, an application to disable driver input during vehicle operation may present the driver with a screen 310, which may restrict usage to emergency calls. For example, the driver may able to call "911" but may be locked out of other applications.

Figure 3B:
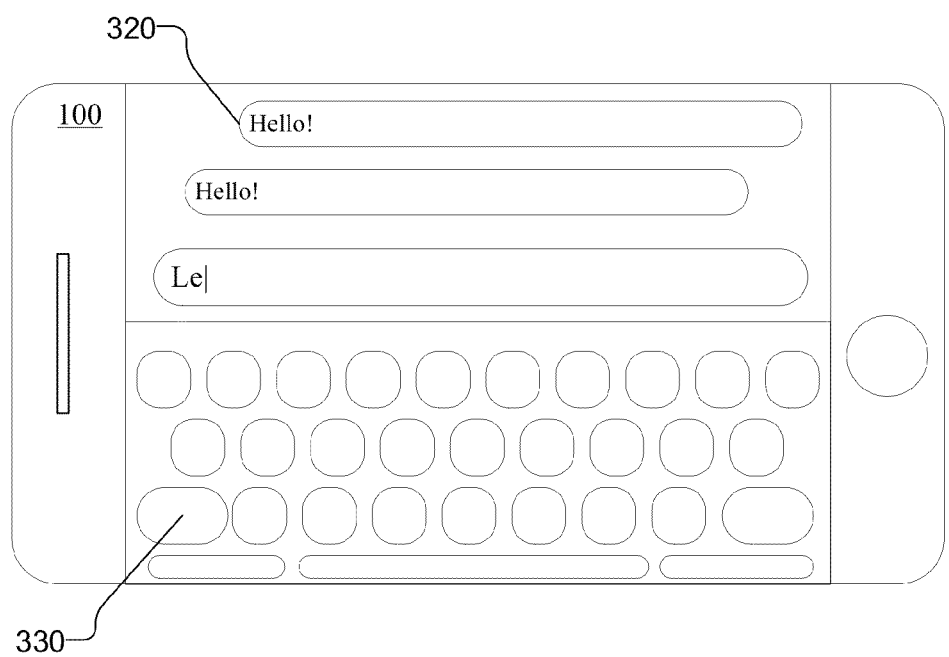
FIG. 3B shows an exemplary UI presented to a passenger upon attempting to use an application a mobile device with touch input.

FIG. 3B shows an exemplary UI presented to a passenger upon attempting to use a texting application on exemplary mobile device 100. As shown in FIG. 3B, a passenger may have access full access to texting application 320 through virtual keyboard 330.

Figure 4A:
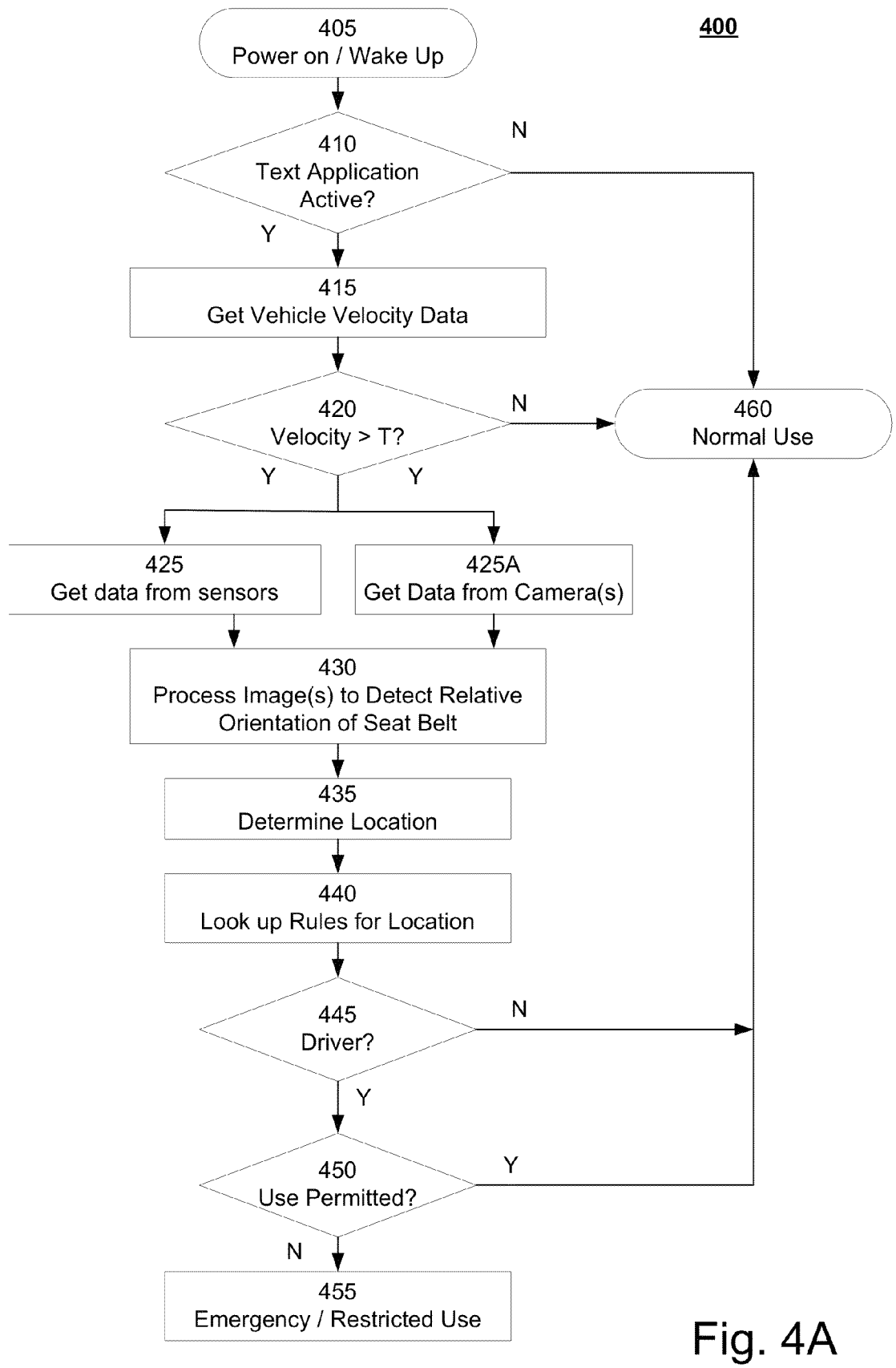
FIG. 4A shows a flowchart of an exemplary method to prevent driver texting in a manner consistent with disclosed embodiments.

FIG. 4A shows a flowchart of an exemplary method 400 to prevent driver texting in a manner consistent with disclosed embodiments. In some embodiments, some or all of method 400 may be implemented by Driver Input Disabling Module 116. In some embodiments, method 400 may be implemented by processor 102 on mobile device 100.

In step 405, a user may power on or wake up a mobile device, such as exemplary mobile device 100. Next, in step 410, the algorithm may determine if a texting application is being activated. If a texting application is not being activated ("N" in step 410), then, in step 460, a normal application UI for the non-texting application may be displayed to the user. For example, MS 100 may permit an application that receives voice commands and/or plays audio to be activated.

If a text input application is being activated ("Y" in step 410), then, in step 415, vehicle input speed may be obtained. The term speed is used to refer to the distance traveled by the vehicle in a time period without regard to the direction of travel. For example, speed may be determined by processor 102 and/or SPS receiver 140 using GPS readings, IMU 134 and/or using input from one of sensors 136. Because the mobile device is located within the vehicle, speed and location information for the vehicle may be based on the location and speed information determined for the mobile device. For example, the location and speed of the mobile device may be used as proxies for the location and speed of the vehicle, respectively.

In step 420, the algorithm may use compare the determined speed with a threshold speed T (T≥0). If vehicle speed is not greater than T, then, in step 460, a normal application UI may be displayed to the user.

In some embodiments, if vehicle speed is greater than T, then, in some embodiments, steps 425 and 425A may be concurrently executed. In step 425, data may be obtained from accelerometer 132 and/or IMU 134 and concurrently, in step 425A, one or more images may be captured by camera(s) or CMOS sensors. In some embodiments, the images may be captured automatically and without user input. For example, image 250 may be captured by camera 130 while obtaining readings concurrently from accelerometer 132 and IMU 134. In some embodiments, camera 130 may capture a series of images when it is woken up, unlocked, powered on, or when a user attempts to access a texting application on MS 100. Further, readings may be obtained concurrently with the capture of the series of images from accelerometer 132, IMU 134, and/or other sensors on MS 100. In some embodiments, readings of accelerometer 132 and/or IMU 134 may be automatically triggered by capture of an image by camera 130. In general, accelerometer and IMU readings may be obtained either concurrently or sequentially within a small time window of each image captured based on the accuracy desired, design considerations, and specifications of camera(s) 130, accelerometer 132 and/or IMU 134.

In some embodiments, input may also be received from one or more other sensors or functional units, in steps 425 and 425A, either contemporaneously or within a small time window of the image capture. For example, one or more images captured by a rear facing camera may also be received in step 425A. As another example, sensory input from audio sensors, depth sensors, ambient light sensors, RSSI or RTT measurements, including any measurements related to Bluetooth or wireless measurements onboard the vehicle, vehicular instrumentation measurements that may be obtained wirelessly by MS 100, etc may be received in conjunction with the capture of images by cameras 130.

In step 430, one or more of the captured images may be processed to determine the relative orientation of the seat belt. For example, in some embodiments, accelerometer 132 and IMU 134 input may be used to register the images relative to a horizon, an edge of the seat belt may be detected in one or more of the images, and the slope of a line (such as one of lines 240 or 280) representing the seat belt may be determined relative to the horizon. In some embodiments, a pair of lines, such as lines 244 & 242, or 282 & 284, which correspond to the two edges of seat belts 230 and 270, respectively, may be identified and the slopes of the lines relative to the horizon may be determined. In some embodiments, seat belt standards may be used to inform or set parameters for edge detection on the digital images. For example, based on the standards, edges may be identified in an angular range relative to the local horizon. In some embodiments, the series of images captured by camera(s) 130 may be processed until the presence or absence of seat belt in the image can be determined. In some embodiments, after an image has been processed, additional images may be processed based on parameters associated with the algorithm. For example, in one embodiment, if a seat belt has not been identified in an image, then additional images may be processed to determine an edge of the seat belt. In another embodiment, once a seat belt has been identified in an image, additional images may be processed to identify an edge of the seat belt in the additional images for corroboration and/or for other reasons.

In step 435, additional information may be sought about the current location of mobile device 100. For example, a location server (LCS) database may be consulted to determine the location of mobile device 100.

Next, in step 440, the rules for the current location may be consulted. In some embodiments, relevant rules pertaining to the use of mobile device may be available in a database stored on mobile device 100 and/or on a database stored on a remote server, such as server 150, accessible wirelessly by mobile device 100.

In some embodiments, the determination whether the user is a driver or passenger may be made based, in part, on the country where mobile device is currently located. For example, interpretation of the slope of line 240 or line 280 may depend on whether the country where the mobile device is currently located follows right hand drive or left hand drive. In some embodiments, mobile device 100 may receive information pertaining to the country where it is currently located when it registers with the cellular network and may store the information in memory 104. In some embodiments, if a seat belt is not detected, for example, in an attempt by the driver to defeat the sensor, the texting application may be disabled but mobile device may include an additional audible warning to wear a safety belt.

In step 445, the slope of the line representing the seat belt may be used to determine if the user is a driver or a passenger in the vehicle. In step 445, if the user is not a driver ("N" in step 445) then, in step 460, the usual screen or graphical user interface (GUI) associated with the text application desired by the user may be displayed. In some embodiments, if the user is a driver ("Y" in step 445) then, in step 450, additional information pertaining to the rules for the current location may be used to determine whether the use of texting applications is permitted.

In some embodiments, in step 450, if method 400 determines that the rules of the location (or jurisdiction in which the mobile device is currently located) permit the use of mobile devices and text applications by the driver during vehicle operation ("Y" is step 450), then, in step 460, the usual screen or GUI associated with the text application desired by the user is displayed. On the other hand, if the algorithm determines that the use of text applications by the driver during vehicle operation is not permitted ("N" in step 450), then, in step 455, the user may be presented with a screen or interface restricting use of the mobile device to emergency numbers. For example, the user may be presented with screen 310, which may restrict usage to emergency calls or one or more predetermined numbers.

In some embodiments, input from additional sensors, such as exemplary sensors 136, or a rear facing camera, may be used by an application to disable or enable driver texting during vehicle operation. For example, vibration and ambient noise analysis from the accelerometer and microphone may be used to override the seat belt detector to allow legitimate texting on aircraft and trains when the speed is above the threshold. As another example, an image taken by a rear-facing camera on mobile device 100 may be used to distinguish the driver from a rear seat passenger in the vehicle. In some embodiments, an ambient noise sensor or a vibration sensor may be used to distinguish the driver from other passengers and may provide corroborating input to an application to disable driver texting during vehicle operation. In another embodiment, analysis of sounds emitted by a speaker on mobile device 100 and relayed through the vehicle speaker system may be used to corroborate the location of the user. In some embodiments, measurements in conjunction with communication using Bluetooth or other wireless devices within the vehicle may be used to provide corroboration for an application to disable driver texting during vehicle operation. In some embodiments, depth information provided by one or more depth sensors may be used to determine the distance of one or more objects in the image from the camera and the determined distance may be used to may be used to distinguish the driver from other passengers and may provide corroborating input to an application to disable driver texting during vehicle operation. For example, the distance of the dashboard, instrument panel, steering wheel, or one or more occupants relative to the camera may be determined using information provided by the depth sensors and the determined distance may be used as input to an application to disable driver texting during vehicle operation. In general, various other unique elements of images taken inside vehicles and/or other features/measurements captured by sensors 136 may be used to corroborate detection by DIDM 116.

In general, an application to disable driver texting during vehicle operation may use information from a variety of additional sensors and the input from the additional sensors may be weighted based on the current environment, past reliability and other heuristics and factors to determine whether a user is a passenger or driver and to determine whether to permit use of a text application during vehicle operation.

Figure 4B:
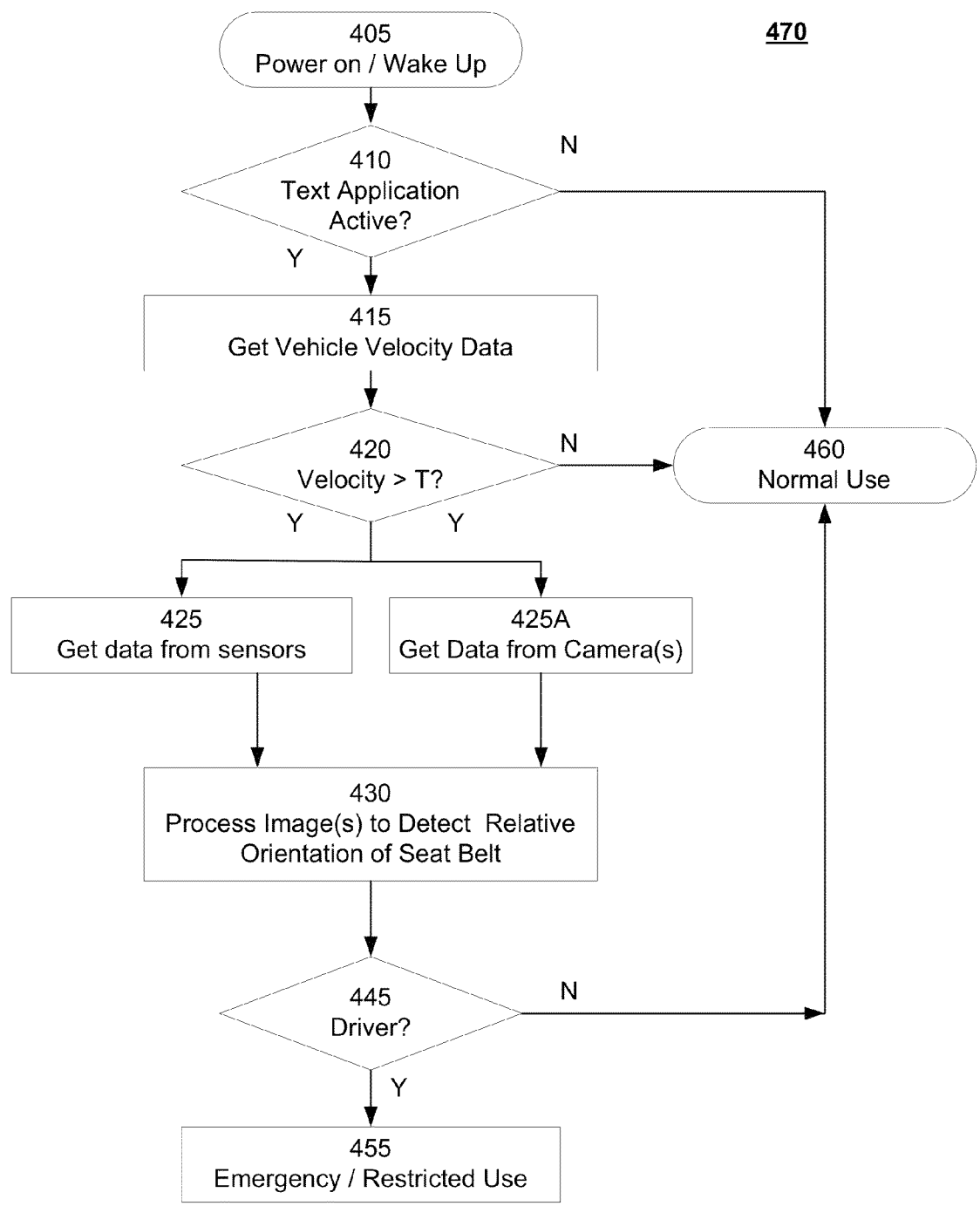
FIG. 4B shows a flowchart of another exemplary method to prevent driver texting in a manner consistent with disclosed embodiments.

In some embodiments, the functions recited in steps in method 400 may be rearranged, combined or otherwise altered in a manner consistent with embodiments disclosed herein. For example, FIG. 4B shows a flowchart of an alternate method 470 to prevent driver texting in a manner consistent with disclosed embodiments. In FIG. 4B, blocks labeled with the same identifiers as blocks in FIG. 4A perform similar functions. In some embodiments, some or all of method 470 may be implemented by DIDM 116 and/or by processor 102 on mobile device 100.

In step 405, a user may power on, wake up, unlock, and/or attempt to use a mobile device, such as exemplary mobile device 100. Next, in step 410, the method may determine if a texting application is being activated. If a texting application is not being activated ("N" in step 410), then, in step 460, a normal application UI for the non-texting application may be displayed to the user. For example, MS 100 may permit an application that receives voice commands and/or plays audio to be activated.

If a text input application is being activated ("Y" in step 410), then, in step 415, vehicle input speed may be obtained. For example, the location and speed of the mobile device may be used as proxies for the location and speed of the vehicle, respectively.

In step 420, the method may use compare the determined speed with a threshold speed T (T≥0). If vehicle speed is not greater than T, then, in step 460, a normal application UI may be displayed to the user.

In some embodiments, if vehicle speed is greater than T, then, in some embodiments, steps 425 and 425A may be concurrently executed. In step 425, data may be obtained from accelerometer 132 and/or IMU 134 and concurrently, in step 425A, one or more images may be captured by camera(s) or CMOS sensors automatically. In some embodiments, input may also be received from one or more other sensors or functional units, in steps 425 and 425A, either contemporaneously or within a small time window of the image capture. For example, one or more images captured by a rear facing camera may also be received in step 425A. As another example, sensory input from audio sensors, depth sensors, ambient light sensors, RSSI or RTT measurements, including any measurements related to Bluetooth or wireless measurements onboard the vehicle, vehicular instrumentation measurements that may be obtained wirelessly by MS 100, etc may be received in conjunction with the capture of images by cameras 130.

In step 430, one or more of the captured images may be processed to determine the relative orientation of the seat belt. In some embodiments, the orientation of seat belt may be determined relative a frame of reference. For example, in some embodiments, accelerometer 132 and IMU 134 input may be used to register the images relative to a horizon, an edge of the seat belt may be detected in one or more of the images, and the slope of a line (such as one of lines 240 or 280) representing the seat belt may be determined relative to the horizon. In some embodiments, a pair of lines, such as lines 244 & 242, or 282 & 284, which correspond to the two edges of seat belts 230 and 270, respectively, may be identified and the slopes of the lines relative to the horizon may be determined. In some embodiments, seat belt standards may be used to inform or set parameters for edge detection on the digital images.

In step 445, the slope of the line representing the seat belt may be used to determine if the user is a driver or a passenger in the vehicle. In step 445, if the user is not a driver ("N" in step 445) then, in step 460, the usual screen or graphical user interface (GUI) associated with the text application desired by the user may be displayed. In some embodiments, if the user is a driver ("Y" in step 445) then, in step 455, the user may be presented with a screen or interface restricting use of the mobile device to emergency and/or select predetermined numbers. In some embodiments, a default speed threshold and drive configuration may be assumed and the determination of the whether the user is a driver may be made based on the default speed threshold and drive configuration.

In some embodiments, information pertaining to location specific jurisdictional rules such as the drive configuration may be available to DIDM 116 and/or pre-programmed into MS 100, and/or downloaded into MS 100 upon registration with a network. The information may be used to determine whether the user is a driver based on the slope of a line corresponding to the seat belt. In some embodiments, where location information is unavailable, a speed threshold and a default drive configuration may be assumed based on the last known/most recent location for which information is available. In some embodiments, a "time zone" or other configuration setting on MS, or a network "home location" may be used to infer the location of MS 100 and obtain a drive configuration and speed threshold based on the inferred location.

Although the present disclosure is described in relation to the drawings depicting specific embodiments for instructional purposes, the disclosure is not limited thereto. Various adaptations and modifications may be made without departing from the scope. Therefore, the spirit and scope of the appended claims should not be limited to the foregoing description.

What is claimed is:

1. A processor-implemented method comprising:
    processing an image captured in a vehicle by a mobile device to identify a seat belt in the image;
    determining a slope of the seat belt relative to a horizon, wherein the horizon is determined using information pertaining to a position and an orientation of the mobile device relative to a frame of reference at a time when the image was captured;
    determining a speed of the mobile device; and
    disabling at least one text application on the mobile device based, at least in part, on the slope of the seat belt and the speed of the mobile device and one or more of:
        mobile device usage rules in a jurisdiction corresponding to a current location of the mobile device,
        drive configuration for vehicles in the jurisdiction, or
        a determination of whether a user of the mobile device is a driver of the vehicle.

2. The processor implemented method of claim 1, wherein processing the captured image to identify the seat belt further comprises detecting at least one edge in the image, wherein the at least one detected edge corresponds to one of two edges of the seat belt.

3. The processor implemented method of claim 1, wherein determining the slope of the seat belt relative to the horizon further comprises:
    generating at least one of a pair of lines in the image, each line in the pair corresponding to a detected edge of the seat belt; and
    determining a slope of the at least one line relative to the horizon, wherein the slope of the seat belt is determined from the slope of the at least one line.

4. The processor implemented method of claim 1, wherein disabling the at least one text application on the mobile device is based further, in part, input from one or more sensors on the mobile device.

5. The processor implemented method of claim 1, wherein a determination of whether the user of the mobile device is the driver is based, in part, on the slope of the seat belt.

6. The processor implemented method of claim 1, wherein the mobile device comprises a camera and the camera is used to capture the image in the vehicle.

7. The processor implemented method of claim 6, wherein a position and an orientation of the camera is used as a proxy for the position and orientation of the mobile device.

8. The processor implemented method of claim 1, wherein the mobile device is situated within the vehicle and the speed of the mobile device serves as a proxy for the speed of the vehicle.

9. The processor implemented method of claim 1, wherein the method is performed when the mobile device is powered on, or is woken up from a sleep state, or is unlocked.

10. The processor implemented method of claim 1, wherein the jurisdiction corresponding to the current location of the mobile device is determined based on at least one of:
   information received from a location server (LCS) in a cellular network serving the mobile device, or
   a Satellite Positioning System (SPS) in communication with the mobile device.

11. The processor implemented method of claim 1, wherein information pertaining to the speed of the mobile device, and the position and orientation of the mobile device at the time of image capture relative to the frame of reference is obtained, based in part, from measurements of an Inertial Measurement Unit (IMU) housed in the mobile device.

12. The processor implemented method of claim 11, wherein the IMU comprises an accelerometer.

13. The processor implemented method of claim 1, further comprising displaying an emergency number to call upon disabling the text application.

14. The processor implemented method of claim 1, wherein the method is performed on the mobile device.

15. A mobile device comprising:
   a camera capable of capturing an image in a vehicle;
   an Inertial Measurement Unit (IMU) coupled to the camera and capable of determining a speed of the mobile device and a position and an orientation of the camera relative to a frame of reference at a time of image capture; and
   a processor coupled to the camera and the IMU, wherein the processor is configured to process the image captured by the camera to:
      identify a seat belt in the image;
      determine a slope of the seat belt relative to a horizon, wherein the horizon is determined using information provided by the IMU pertaining to the position and orientation of the camera relative to a frame of reference at the time when the image was captured; and
   disable the execution of at least one text application on the mobile device based, at least in part, on the slope of the seat belt and the speed and one or more of:
      mobile device usage rules in a jurisdiction corresponding to a current location of the mobile device,
      drive configuration for vehicles in the jurisdiction, or
      a determination of whether a user of the mobile device is a driver of the vehicle.

16. The mobile device of claim 15, wherein to identify the seat belt, the processor is further configured to detect at least one edge in the image, wherein the at least one detected edge corresponds to one of two edges of the seat belt.

17. The mobile device of claim 15, wherein to determine the slope of the seat belt relative to the horizon, the processor is further configured to:
   generate at least one of a pair of lines in the image, each line in the pair corresponding to a detected edge of the seat belt; and
   determine a slope of the at least one line relative to the horizon, wherein the slope of the seat belt is determined from the slope of the at least one line.

18. The mobile device of claim 15, further comprising one or more sensors coupled to the processor; and
   wherein the processor is configured to disable the at least one text application on the mobile device is based further, in part, on input from the one or more sensors.

19. The mobile device of claim 15, wherein the processor is configured to determine of whether the user of the mobile device is the driver is based, in part, on the slope of the seat belt.

20. The mobile device of claim 15, further comprising:
   a transceiver coupled to the processor and capable of communicating with a Location Server (LCS) over a cellular network to determine the current location of the mobile device; and
   wherein the processor is configured to determine the jurisdiction based, in part, on the current location of the mobile device.

21. The mobile device of claim 15, wherein the apparatus further comprises:
   a Satellite Positioning System receiver coupled to the processor and capable of determining the current location of the mobile device; and
   wherein the processor is configured to determine the jurisdiction based, in part, on current location of the mobile device.

22. The mobile device of claim 15, further comprising a screen coupled to processor, and
   wherein the processor is configured to display an emergency number to call on the screen upon disabling the text application.

23. The mobile device of claim 15, wherein the IMU comprises an accelerometer.

24. A mobile device comprising:
   an imaging means, the imaging means to capture an image in a vehicle;
   an inertial measurement means coupled to the imaging means, the inertial measurement means to determine a speed of the mobile device and a position and an orientation of the imaging means relative to a frame of reference at a time of image capture; and
   a processing means coupled to the imaging means and the inertial measurement means, the processing means to process the image captured by the imaging means and further comprising:
      means for identifying a seat belt in the image;
      means for determining a slope of the seat belt relative to a horizon, wherein the horizon is determined using information provided by the inertial measurement means pertaining to the position and orientation of the imaging means relative to a frame of reference at the time when the image was captured; and
   means for disabling the execution of at least one text application on the mobile device based, at least in part, on the slope of the seat belt and the speed and one or more of:
      mobile device usage rules in a jurisdiction corresponding to a current location of the mobile device,
      drive configuration for vehicles in the jurisdiction, or a determination of whether a user of the mobile device is a driver of the vehicle.

25. The mobile device of claim 24, wherein means for identifying the seat belt further comprises means for detecting at least one edge in the image, wherein the at least one detected edge corresponds to one of two edges of the seat belt.

26. The mobile device of claim 24, wherein means for determining the slope of the seat belt relative to the horizon further comprises:
   means for generating at least one of a pair of lines in the image, each line in the pair corresponding to a detected edge of the seat belt; and
   means for determining a slope of the at least one line relative to the horizon, wherein the slope of the seat belt is determined from the slope of the at least one line.

27. The mobile device of claim 24, further comprising one or more sensing means coupled to the processing means; and
wherein the means for disabling the at least one text application is based further, in part, on input from the one or more sensing means.

28. The mobile device of claim 24, wherein the determination of whether the user of the mobile device is the driver, is based, in part, on the slope of the seat belt.

29. The mobile device of claim 24, further comprising:
a transceiver means coupled to the processing means, the transceiver means to communicate with a Location Server (LCS) over a cellular network to determine the current location of the mobile device; and
wherein the means for disabling the at least one text application on the mobile device further comprises means for determining the jurisdiction based, in part, on the current location of the mobile device.

30. The mobile device of claim 24, wherein the apparatus further comprises:
a Satellite Positioning System receiving means coupled to the processor and capable of determining the current location of the mobile device; and
wherein the means for disabling the at least one text application on the mobile device further comprises means for determining the jurisdiction based, in part, on the current location of the mobile device.

31. The mobile device of claim 24, further comprising display means coupled to the processing means, and
wherein the display means displays an emergency number to call when the text application is disabled.

32. The mobile device of claim 24, wherein the inertial measurement means further comprises accelerometer means.

33. A non-transitory computer-readable medium comprising instructions, which when executed by a processor, perform steps in a method, the steps comprising:
processing an image captured in a vehicle by the mobile device to identify a seat belt in the image;
determining a slope of the seat belt relative to a horizon, wherein the horizon is determined using information pertaining to a position and an orientation of the mobile device relative to a frame of reference at a time when the image was captured;
determining a speed of the mobile device; and
disabling at least one text application on a mobile device based, at least in part, on the slope of the seat belt and the speed of the mobile device and one or more of:
mobile device usage rules in a jurisdiction corresponding to a current location of the mobile device,
drive configuration for vehicles in the jurisdiction, or
a determination of whether a user of the mobile device is a driver of the vehicle.

34. The computer-readable medium of claim 33, wherein processing the captured image to identify the seat belt further comprises detecting at least one edge in the image, wherein the at least one detected edge corresponds to one of two edges of the seat belt.

35. The computer-readable medium of claim 33, wherein determining the slope of the seat belt relative to the horizon further comprises:
generating at least one of a pair of lines in the image, each line in the pair corresponding to a detected edge of the seat belt; and
determining a slope of the at least one line relative to the horizon, wherein the slope of the seat belt is determined from the slope of the at least one line.

36. The computer-readable medium of claim 33, wherein disabling the at least one text application on the mobile device is based further, in part, input from one or more sensors on the mobile device.

37. The computer-readable medium of claim 33, wherein a determination of whether the user of the mobile device is the driver is based, in part, on the slope of the seat belt.

38. The computer-readable medium of claim 33, wherein the mobile device comprises a camera and the camera is used to capture the image in the vehicle.

39. The computer-readable medium of claim 38, wherein a position and an orientation of the camera is used as a proxy for the position and orientation of the mobile device.

40. The computer-readable medium of claim 33, wherein the mobile device is situated within the vehicle and the speed of the mobile device serves as a proxy for the speed of the vehicle.

41. The computer-readable medium of claim 33, wherein the method is performed when the mobile device is powered on, or is woken up from a sleep state, or is unlocked.

42. The computer-readable medium of claim 33, wherein the jurisdiction corresponding to the current location of the mobile device is determined based on at least one of:
information received from a location server (LCS) in a cellular network serving the mobile device, or
a Satellite Positioning System (SPS) in communication with the mobile device.

43. The computer-readable medium of claim 33, wherein information pertaining to the speed of the mobile device, and the position and orientation of the mobile device at the time of image capture relative to the frame of reference is obtained, based in part, from measurements of an Inertial Measurement Unit (IMU) housed in the mobile device.

44. The computer-readable medium of claim 43, wherein the IMU comprises an accelerometer.

45. The computer-readable medium of claim 33, further comprising displaying an emergency number to call upon disabling the text application.

* * * * *